United States Patent [19]
Atkinson

[11] Patent Number: 5,854,591
[45] Date of Patent: Dec. 29, 1998

[54] SYSTEM AND METHOD FOR PROCESSING PASSENGER SERVICE SYSTEM INFORMATION

[75] Inventor: Michael R. Atkinson, Irvine, Calif.

[73] Assignees: Sony Trans Com, Inc., Irvine, Calif.; Sony Corporation, Tokyo, Japan

[21] Appl. No.: 713,811

[22] Filed: Sep. 13, 1996

[51] Int. Cl.$^6$ .......................... H04N 7/00; H04L 12/403; G05B 23/02

[52] U.S. Cl. .................... 340/825.17; 395/291; 395/289; 395/877; 340/825.06; 340/825.08; 370/348; 370/449; 370/461; 348/8

[58] Field of Search ............... 348/7, 8, 12; 340/825.08, 340/825.06, 825.5; 395/289, 877, 308; 364/240, 260, 271, 239, 229, 240.8, 230.4, 238.3, 259; 370/449, 346, 348, 451, 463, 461

[56] References Cited

U.S. PATENT DOCUMENTS

| | | | |
|---|---|---|---|
| 3,795,771 | 3/1974 | Gunderson et al. | 179/15 |
| 4,352,200 | 9/1982 | Oxman | 455/41 |
| 4,428,078 | 1/1984 | Kuo | 455/3 |
| 4,584,603 | 4/1986 | Harrison | 358/86 |
| 4,647,980 | 3/1987 | Steventon et al. | 358/254 |
| 4,763,360 | 8/1988 | Daniels et al. | 455/3 |
| 4,774,514 | 9/1988 | Hildebrandt et al. | 340/971 |
| 4,835,604 | 5/1989 | Kondo et al. | 358/86 |
| 4,866,515 | 9/1989 | Tagawa et al. | 358/86 |
| 4,896,209 | 1/1990 | Matsuzaki et al. | 358/86 |
| 4,897,714 | 1/1990 | Ichise et al. | 358/86 |
| 4,920,432 | 4/1990 | Eggers et al. | 360/33.1 |
| 4,975,696 | 12/1990 | Salter, Jr. et al. | 340/973 |
| 5,081,576 | 1/1992 | Ward | 395/289 |
| 5,123,015 | 6/1992 | Brady, Jr. et al. | 370/112 |
| 5,214,505 | 5/1993 | Rabowsky et al. | 358/86 |
| 5,220,419 | 6/1993 | Sklar et al. | 358/86 |
| 5,276,441 | 1/1994 | Katsurada | 340/825.03 |
| 5,289,272 | 2/1994 | Rabowsky et al. | 348/8 |
| 5,311,302 | 5/1994 | Berry et al. | 379/14 |
| 5,347,632 | 9/1994 | Filepp et al. | 395/200 |
| 5,404,567 | 4/1995 | DePietro et al. | 455/6.3 |
| 5,414,455 | 5/1995 | Hooper et al. | 348/7 |
| 5,442,390 | 8/1995 | Hooper et al. | 348/7 |
| 5,529,265 | 6/1996 | Sakurai | 244/118 |
| 5,539,448 | 7/1996 | Verhille et al. | 348/6 |
| 5,555,466 | 9/1996 | Scribner et al. | 348/8 |
| 5,557,541 | 9/1996 | Schulhof et al. | 364/514 |
| 5,568,180 | 10/1996 | Okamoto | 348/7 |
| 5,568,181 | 10/1996 | Greenwood et al. | 348/7 |
| 5,568,484 | 10/1996 | Margis | 370/85.5 |
| 5,572,442 | 11/1996 | Schulhof et al. | 455/4.2 |
| 5,581,270 | 12/1996 | Smith et al. | 345/2 |
| 5,586,937 | 12/1996 | Menashe | 463/41 |
| 5,596,647 | 1/1997 | Wakai et al. | 381/77 |
| 5,608,447 | 3/1997 | Farry et al. | 348/7 |
| 5,608,448 | 3/1997 | Smoral et al. | 348/7 |
| 5,612,730 | 3/1997 | Lewis | 348/12 |
| 5,631,693 | 5/1997 | Wunderlich et al. | 348/7 |
| 5,634,012 | 5/1997 | Stefik et al. | 395/239 |

OTHER PUBLICATIONS

"Two–Way Street" *Inflight*, Harbison & Dunn, pp. 14–18 (Mar. 1996).

(List continued on next page.)

*Primary Examiner*—Michael Horabik
*Assistant Examiner*—Jean B. Jeanglaude
*Attorney, Agent, or Firm*—Blakely, Sokiloff, Taylor & Zafman LLP

[57] ABSTRACT

Implemented on a vehicle, a digital in-transit entertainment system that assists in providing passenger services to a plurality of end nodes of a vehicle. The system includes a multi-drop digital communication bus, preferably configured to support RS-485 standards. A plurality of zone bridge units ("ZBUs") and a system manager unit ("SMU") are coupled to the digital communication bus. At least one ZBU is responsible for signaling headend equipment to perform a requested passenger service. The SMU is also designed to signal another type of equipment if implemented in lieu of the first type. Both the ZBUs as well as the SMU are designed to contain PSS status information for every end node of the vehicle to maintain coherency.

20 Claims, 8 Drawing Sheets

OTHER PUBLICATIONS

"Airframers Force Disipline in High–Stakes IFE Market" *Aerospace Business*, Velocci, pp. 41–43 (Mar. 25, 1996).

"MDDS is Here!" *Digital Video News* p. 1 (Jul. 1995).

"Flying Those Interactive Skies" *TV Technology*, Morris (Oct. 1995).

"Optibase & BEA make MPEG Fly!", *Digital Video News* Jul. 1995.

"Video–On–Demand Trail Starts on Alitalia Airlines Other Airplane Tests Have Same Maddening Delays as Cable/ Telco Trials", Unlisted, *European Media Business & Finance* Nov. 3, 1995.

"BE Aerospace Interactive Video System Successfully Debuts on British Airways B747; Company Awarded $33 Million in New Seating Programs" Unlisted, *Business Wire* Nov. 21, 1995.

"TNCi Continues Airview (™) Enhancement with Telephone Interface", Unlisted, *PR Newswire* Nov. 28, 1995.

"First Totally Digitalized In–Flight Entertainment System to be Introduced on International Carrier—Alitalia; IFT System will Debut on Rome to Chicago Flight December 1st", Unlisted, *In–Flight Entertainment* Jan. 1996.

"TNC to Put Internet Service inot its IFE", Unlisted, *In–Flight Entertainment* Jan. 1996.

"Interactive Flight Technologies Signs Agreement with Swissair; IFT to Install In–Flight Entertainment System, Complete with Casino–Style Gambling, On All 21 of its Long–Haul Jets", Unlisted, *Business Wire* May 2, 1996.

The Network Connection Announces Hiper Cheetah—300 Simultaneous Video Streams, Unlisted, *PR Newswire* Jun. 7, 1996.

SYSTEM AND METHOD FOR PROCESSING PASSENGER SERVICE SYSTEM INFORMATION

BACKGROUND OF THE INVENTION

1. Field of the Invention

The present invention relates to the field of telecommunications. More particularly, the present invention relates to a network and a uniform method for processing passenger service system information independent of the type of vehicle employing the network.

2. Description of Art Related to the Invention

Over the last few decades, commercial aircraft has become a necessary mode of travel for personal and business reasons. Usually, as shown in FIG. 1, a cabin 100 of a commercial aircraft is equipped with a distributed network that is configured to transmit messages based on passenger service system ("PSS") information, hereinafter referred to as a "PSS network", to pre-installed aircraft equipment 110. "PSS information" includes keystroke values indicating whether one or more particular passenger service(s) have been requested. Examples of passenger services include an "attendant call" requesting aircraft equipment to illuminate an attendant call button and produce of an audible chime, an "attendant call reset" used to discontinue illumination of the attendant call button and production of the audible chime, and a "reading light" requesting activation or inactivation of the reading lamp. Transmission of the PSS information may be initiated by a passenger depressing at least one of a number of control buttons 120 protruding from an overhead compartment 130 situated above each passenger seat 140 or integrated in a hand-held control unit 150 as shown.

Currently, aircraft manufacturers such as Airbus Industries ("Airbus") of Cedex, France and Boeing Company ("Boeing") of Everett, Wash., have adopted different PSS network architectures. Until now, these different network architectures have precluded the development of a uniform PSS network and processing technique that can be used within these and future aircraft in order to mitigate manufacturing and development costs through "economies of scale" and to satisfy requisite speed requirements for newly developed aircraft such as Boeing® 777 aircraft.

Before discussing these architectures, it would be useful to generally define various circuitry that may be implemented within a commercial aircraft. For example, a "seat box" is circuitry used to control the propagation of information (e.g., video, audio, PSS information, etc.) to input/output devices in close proximity to a passenger seat. "Headend equipment" includes pre-installed electronics and electrical circuitry, provided by either a manufacturer of the vehicle, an aircraft in this example, or an original equipment manufacturer, to signal other pre-installed equipment to provide selected passenger services.

The first architecture of the PSS network normally utilized by Airbus Industries includes a plurality of seat boxes, an intermediary device, an IFE supplier specific headend equipment, pre-installed Airbus® headend equipment and Airbus® aircraft equipment being hardware pre-installed to turn-on or turn-off the reading lamp for example. Upon the intermediary device receiving PSS information, it formats the PSS information in accordance with an IFE supplier specific, proprietary communication bus and transmits the newly formatted PSS information to the IFE supplier specific headend equipment. The IFE supplier specific headend equipment is coupled to Airbus® headend equipment through a Cabin Intercommunication Data System ("CIDS") interface in compliance with Aeronautical Radio, Inc. ("ARINC") 429 protocol described below.

Upon a passenger depressing a control button located in close proximity to his or her seat (e.g., integrated on a hand-held control unit or situated on the overhead compartment), PSS information is transferred to a seat box corresponding to that passenger's seat (e.g., seat box). Thereafter, seat box incorporates the PSS information into a message in compliance with IFE supplier specific protocol and transmits the message to the intermediary device.

After receiving the message, the intermediary device removes the PSS information from that message, and embeds the PSS information into a command message having a data structure in compliance with the protocol supported by bus. Normally, this protocol is proprietary to the IFE supplier. Upon being polled by the IFE supplier specific headend equipment, the intermediary device transfers the command message to propagate to the IFE supplier specific headend equipment without maintaining PSS status (i.e., maintaining the current status of the PSS information). Next, the IFE supplier specific headend equipment embeds the PSS information contained in the command message into a message having a data structure in compliance with ARINC 429 protocol (see FIG. 2 below). Thereafter, the IFE supplier specific headend equipment transmits the ARINC 429 message through the CIDS interface to Airbus® headend equipment which instructs the Airbus® aircraft equipment to perform operations requested by the PSS information, such as illuminating the attendant call button and producing an audible chime for example.

As shown in FIG. 2, a bit representation of the data structure of the ARINC 429 message propagating through the CIDS interface is shown. Each message corresponds to a single passenger service requested at a particular passenger seat. The message 200 comprises four bytes (32-bits) in which PSS information is contained in bits 15–17. Bit 15 of the message 205 is used to indicate the desired state of the reading light while bits 16–17 of the message 210 and 215 are used to indicate whether the passenger attendant call and the attendant call reset has been asserted or deasserted, respectively. Bits 18–27 of the message 220–265 are used as seat and row identifiers to indicate the position of the seat from which a keystroke has been made requesting passenger service. Bit 28 of the message 270 is used as a row type identifier to indicate whether the keystroke originated from a passenger seat in the cabin or from a crew reset station located in the cockpit or galley.

The second architecture of the PSS network, normally used by Boeing, includes a plurality of seat boxes directly connected to headend equipment (e.g., Boeing® area box) via a digital communication link. The digital communication link is configured to operate in accordance with RS-485 standard. The configuration and operation of the RS-485 communication link is described in "EIA Standard RS-485" by the Engineering Department of Electronic Industries Association, April 1983. The area box operate as a computer to signal other pre-installed equipment to perform those operations requested by the PSS information such as turning on a reading lamp.

Clearly, it would be advantageous to create a distributed network and a uniform method which can process PSS information in both types of commercial aircraft as well as other modes of transportation.

SUMMARY OF THE INVENTION

Implemented on a vehicle, a digital in-transit entertainment system that assists in providing passenger services to a plurality of passenger seats of a vehicle. The system includes a multi-drop digital communication bus, preferably configured to support RS-485 standards. A plurality of zone bridge units ("ZBUs") and a system manager unit ("SMU") are coupled to the digital communication bus. At least one ZBU is responsible for signaling headend equipment to perform a requested passenger service. The SMU is also designed to signal another type of equipment if implemented in lieu of the first type.

All of the ZBUs as well as the SMU are designed to contain PSS status information for every passenger seat within the vehicle to maintain coherency. At predetermined intervals, the SMU polls each of the ZBUs to place updated PSS status information to the digital communication bus. The updated PSS status information is read by the SMUs and all ZBUs except for the ZBU being polled.

BRIEF DESCRIPTION OF THE DRAWINGS

The features and advantages of the present invention will become apparent from the following detailed description in combination with the figures listed below.

DESCRIPTION OF THE PREFERRED EMBODIMENT

In its preferred embodiment, the present invention relates to a distributed network of an in-transit entertainment system and a uniform method for processing passenger service system ("PSS") information independent of the type of vehicle employed therein. The types of vehicles may include, are not limited to, aircraft, trains, ferries, buses and other modes of mass transit. For clarity sake, however, the preferred embodiment of the present invention will be described as implemented within a commercial aircraft. While numerous specific details are set forth herein to describe the preferred embodiment of the invention, these details may not be required to practice the spirit and scope of the present invention.

Certain terms are used herein to describe various circuitry of the distributed network. For example, an "end node" is a logical entity assigned a unique address on the PAT buses (defined below) such as a passenger seat(s) or any location on the vehicle where passenger services may be provided.

Figure 1:
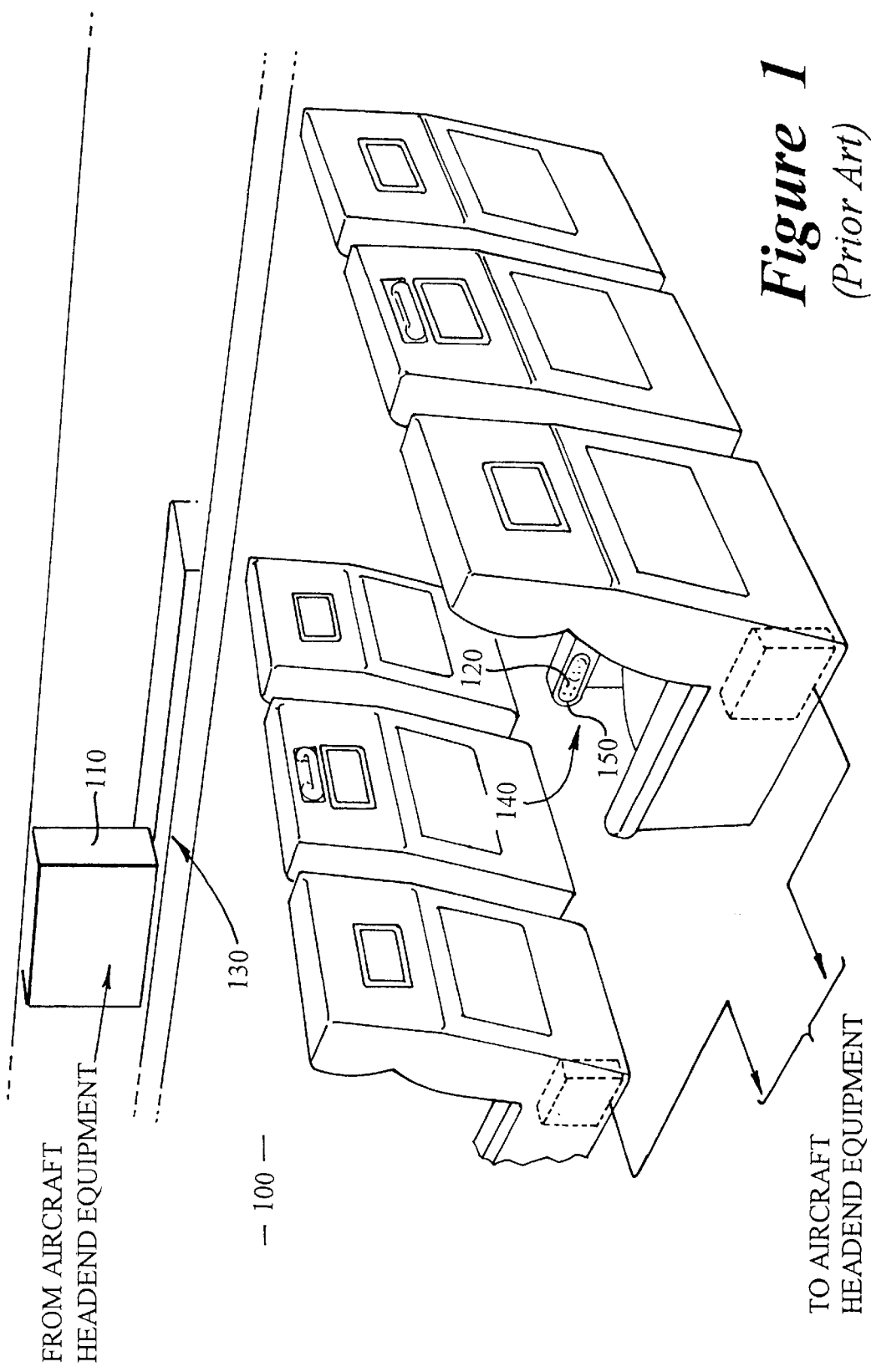
FIG. 1 is an exploded perspective view of a typical passenger aisle of a commercial aircraft in which each passenger is provided with a capability of selecting various passenger services such as activating an attendant call button or a reading light assigned to the passenger seat.
Figure 2:
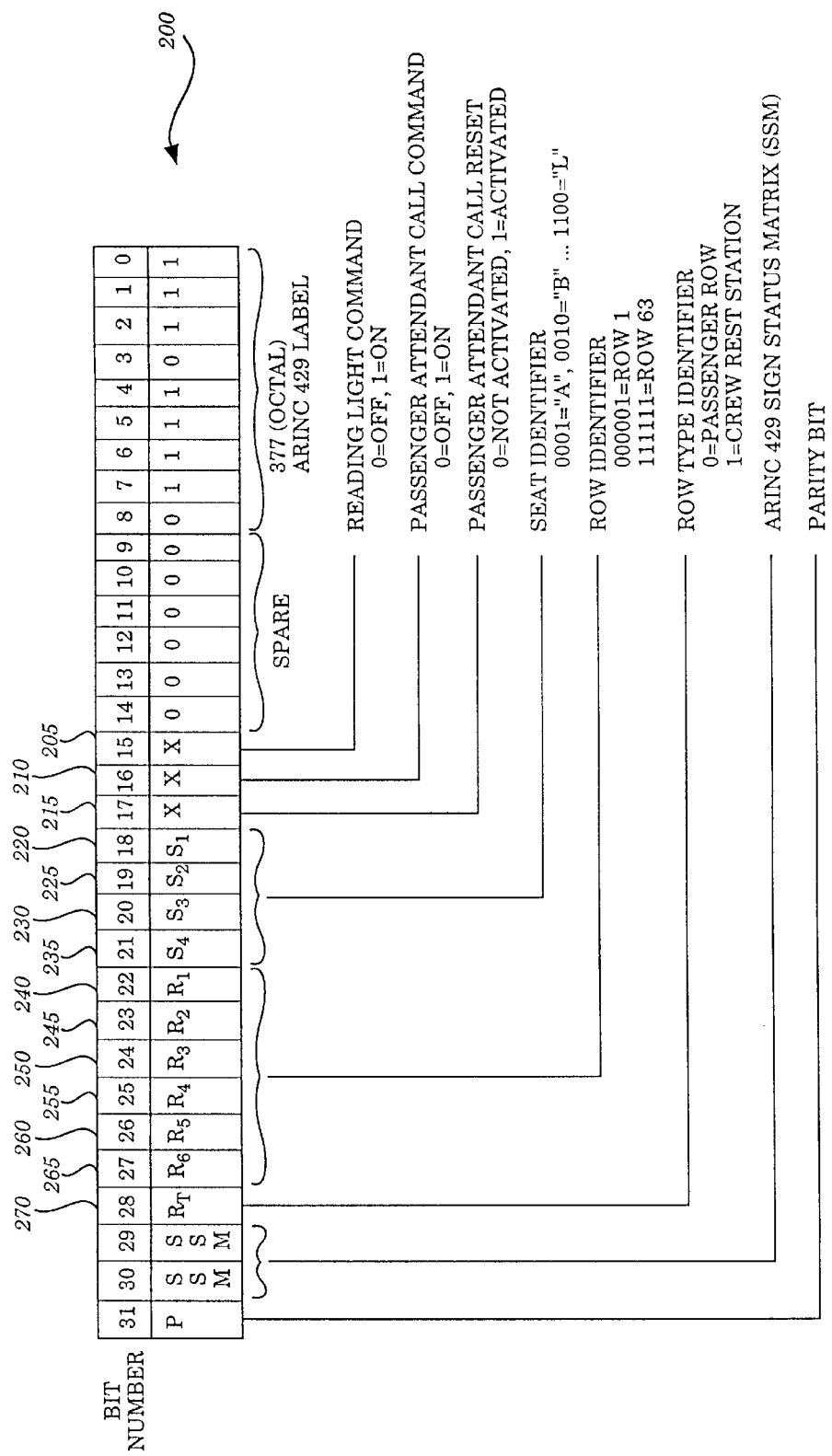
FIG. 2 is a bit representation of the data structure of a message configured in accordance with an ARINC 429 protocol.
Figure 3:
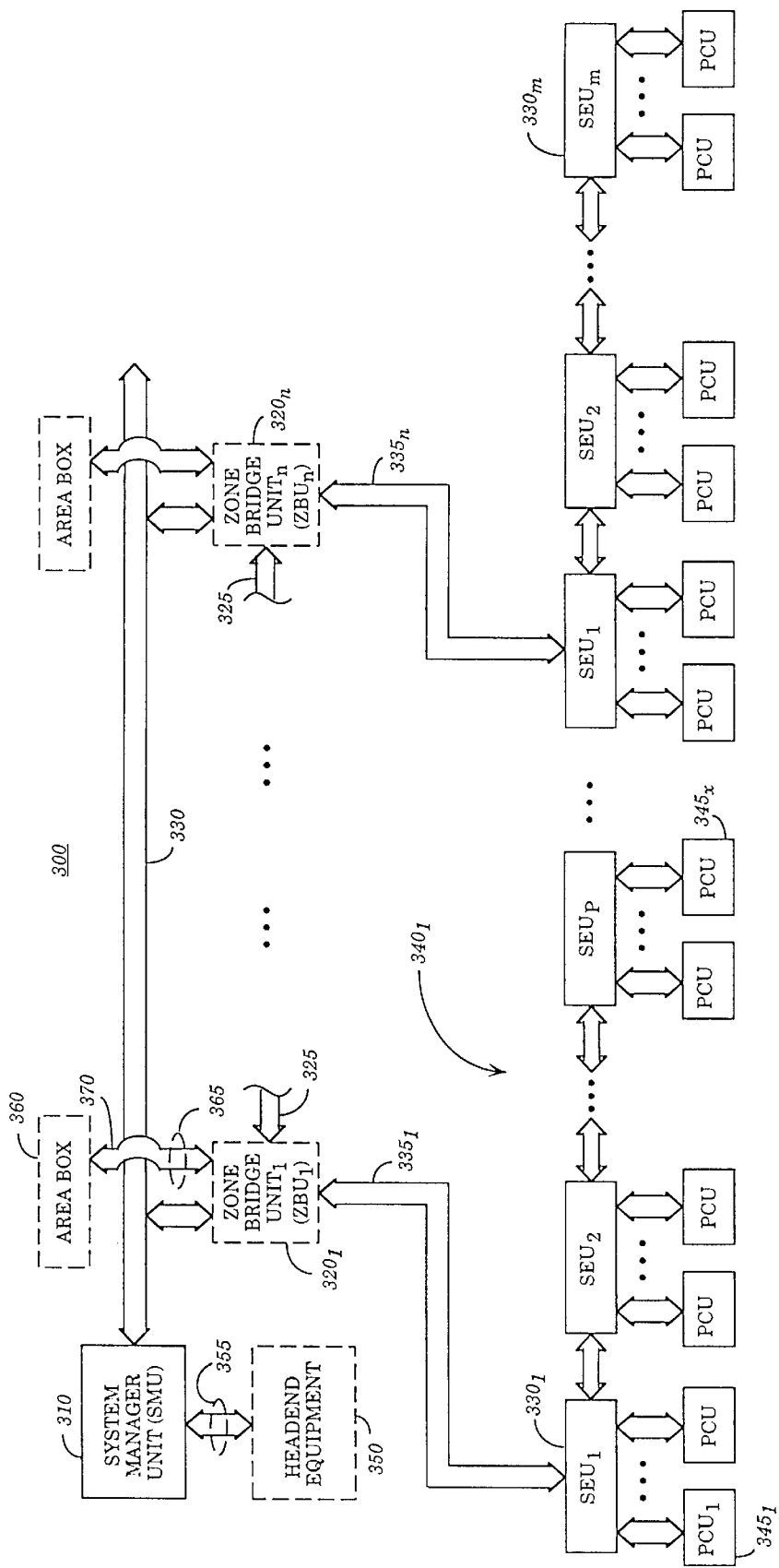
FIG. 3 is a system block diagram of a PSS network operating independent of the type of commercial aircraft.

Referring to FIG. 3, a block diagram of one embodiment of a distributed network 300 which processes PSS information from each node on a commercial aircraft is shown. The distributed network (hereinafter referred to as a "PSS network") 300 includes a system manager unit ("SMU") 310 coupled to a plurality of ZBUs $320_1$–$320_n$ ("n" is a positive whole number, n>1) through a multi-drop RS-485 digital communication bus 330, which supports a data transfer rate of approximately 200 kilobits per second ("Kbps"). The digital communication bus 330 preferably includes a differentially driven, twisted wire pair appropriately shielded by a cable sheath and terminated by a last ZBU $320_n$ on the digital communication bus 330. The use of a differentially driven communication bus mitigates the adverse affect of electromagnetic interference and other noise. However, other types of cabling (e.g., fiber optics) can be used.

Although not shown, each ZBU includes a processor, internal memory (e.g., random access memory "RAM") and a Universal Asynchronous Receiver/Transmitter ("UART") which performs serial-to-parallel conversion of PSS information transferred from the end nodes. ZBUs $320_1$–$320_n$ are coupled together, preferably by IEEE 1394 standard digital cables 325.

Figure 4:
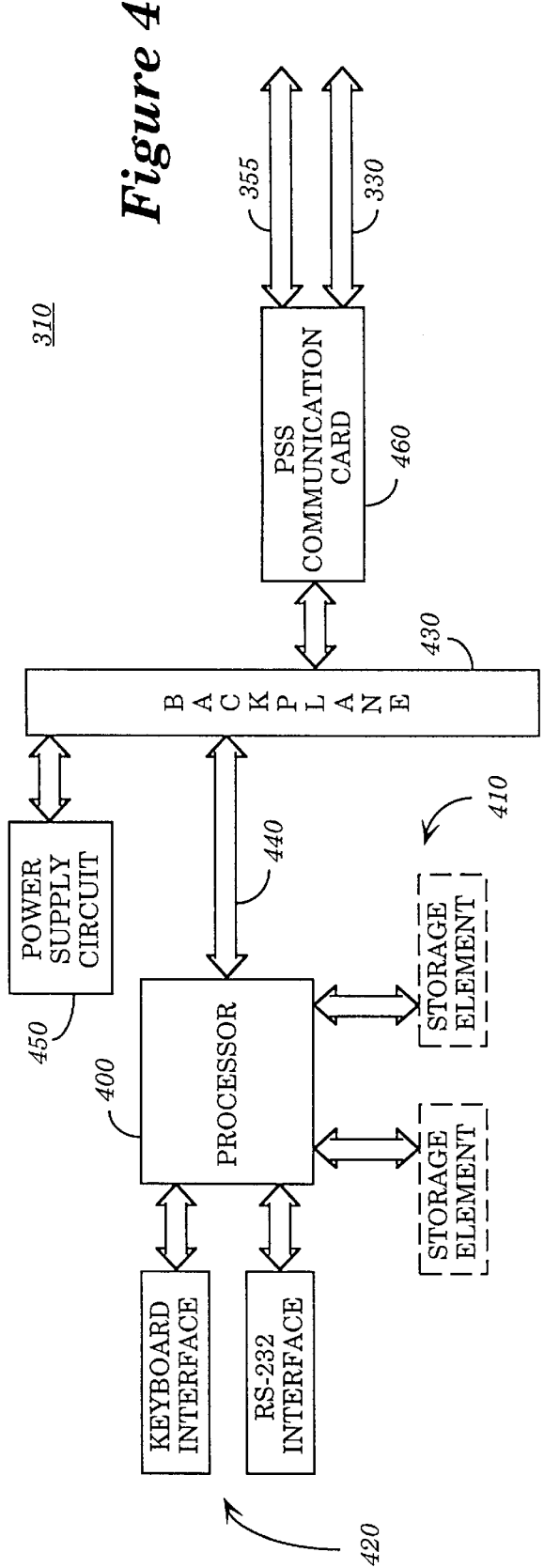
FIG. 4 is a block diagram of a system manger unit ("SMU") of the PSS network of FIG. 3.
Figure 5:
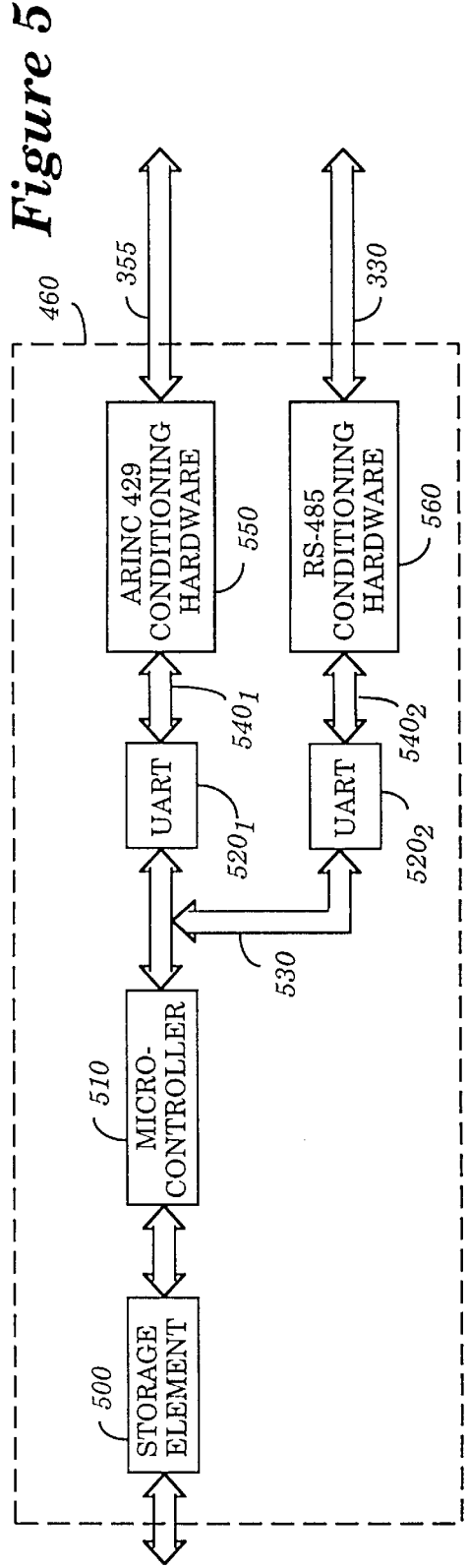
FIG. 5 is a block diagram of a PSS communication board implemented within the SMU of FIG. 4 in order to support communications under RS-485 and ARINC 429 protocols.

Referring now to FIGS. 4 and 5, a preferred embodiments of SMU 310 is illustrated. As generally shown in FIG. 4, SMU 310 comprises at least one processor 400 coupled to one or more storage elements 410 which may include, but is not limited to, a system hard drive, internal RAM and/or a floppy disk drive. Although not shown, processor 400 is further coupled to a number of peripheral devices (e.g., keyboard, printer, touch screen) via peripheral interfaces 420 (e.g., keyboard interface and RS-232 interfaces) in order to receive user inputted information and output processed information.

Besides being coupled to storage elements 410 and peripheral devices, processor 400 is coupled to a backplane 430 through a data bus 440 such as a Peripheral Component Interconnect ("PCI") bus. Backplane 430 routes power to components within SMU 310 from a power supply circuit 450 and operates as a communication interface between processor 400 and a number of communication cards including a PSS communication card 460. PSS communication card 460 supports communications to both digital communication bus 330 and a first interface 355 described below.

A more detailed block diagram of the PSS communication card 460 is shown in FIG. 5. PSS communication card 460 includes a storage element (e.g., a dual-port RAM) 500 coupled to a microcontroller 510 loaded with software to support formatting of information in compliance with a first selected protocol (e.g., ARINC 429 protocol, ARINC 485 protocol) and RS-485 standards. The microcontroller 510 is coupled to a plurality of UARTs $520_1$ and $520_2$ which convert digital information transmitted in parallel along communication lines 530 into serial communications along lines $540_1$ and $540_2$, respectively. The serial communications along lines $540_1$ and $540_2$ are transmitted into conditioning hardware 550 and 560, respectively. Provided the protocol selected between SMU 310 and headend equipment 350 (described below) is ARINC 429 protocol, conditioning hardware 550 and 560 convert the serial digital information into appropriate electrical signals required by ARINC 429 and RS-485, respectively.

Referring back to FIG. 3, PSS network 300 further includes a first plurality of seat electronics units $330_1$–$330_m$ ("m" is a positive whole number, typically m>n). Each SEU is circuitry used to control the propagation of information (e.g., video, audio, PSS information, etc.) between its assigned ZBU and peripheral devices in close proximity to an end node. Such peripheral devices include, but are not limited to a display and a passenger control unit ("PCU"). The PCU includes control buttons for controlling audio channel and volume selection, selecting attendant call or reset, turning on the reading lamp. The PCU further routes telephony information as well as display-related commands (e.g., cursor control commands) from a handset coupled to the PCU.

SMU 310, ZBUs $320_1$–$320_n$ and SEUs $330_1$–$330_m$ are coupled together so that both SMU 310 and each of the ZBUs $320_1$–$320_n$ are privy to the zone configuration of the vehicle, in general, ZBU to SEU assignments. Moreover, such coupling enables SMU 310 and ZBUs $320_1$–$320_n$ to be privy to the status of PSS information associated with every end node in the vehicle.

Representative of the zone configuration described above, each of the plurality of ZBUs $320_1$–$320_n$ is coupled to a selected group of SEUs $340_1$–$340_n$ through high speed, bi-directional Passenger, Audio and Telephone ("PAT") buses $335_1$–$335_n$ operating in accordance with RS-485 electrical standards. The digital PAT buses $335_1$–$335_n$ support a master/slave relationship in which each ZBU operates as a bus master and its SEUs operate as slave devices. For example, ZBU $320_1$ may be coupled to a first selected group of the plurality of SEUs $330_1$–$330_m$, namely $SEU_1$–$SEU_p$ $340_1$ ("p" being a positive whole number, p≦m), through digital PAT bus $335_1$. The digital PAT bus $335_1$ enables ZBU $320_1$ to provide power and information to $SEU_1$–$SEU_p$ $340_1$ and to receive multiplexed audio, PSS information and telephony information from the $SEU_1$–$SEU_p$ $340_1$.

Preferably, $SEU_1$–$SEU_p$ $340_1$ are serially coupled together in a daisy-chain fashion through the PAT bus $335_1$, although other interconnect topologies may be used. This allows multiplexed audio, PSS information, and telephony information to propagate at a data transfer rate, ranging from approximately 4 to 8 megabytes per second ("Mbps") between a passenger control unit ("PCU") $345_1$–$345_x$ ("x" being a positive whole number equal to number of seats for group of SEUs 340), assigned to each end node controlled by $SEU_1$–$SEU_p$ 340 (generally less than approximately 60 end nodes) and their assigned ZBU $320_1$.

As previously mentioned, the plurality of ZBUs $320_1$–$320_n$ are preferably coupled to the SMU 310 through the multi-drop RS-485 digital communication bus 330. The digital communication bus 330 supports a master/slave relationship in which SMU 310 operates as the bus master while ZBUs $320_1$–$320_n$ operate as slaves. In addition, digital communication bus 330 allows all ZBUs $320_1$–$320_n$, coupled to the digital communication bus 330, to receive information when they are not transmitting information.

The digital communication bus 330 supports three modes of operation selected by the SMU 310; namely, (i) Maintenance; (ii) Initialization; and (iii) PSS servicing modes. The PSS servicing mode is described below in detail. During the Maintenance mode, various maintenance functions may be performed on one or more targeted ZBU as well as those devices coupled to the ZBU such as, for example, one or more SEUs, video displays and the like. These maintenance functions may include resetting certain devices coupled to digital communication bus 330, downloading software into certain devices and other maintenance related operations. During Initialization mode, however, each of the ZBUs $320_{1-320n}$ is informed of the zone configuration of the commercial aircraft. This operation may occur at powerup and upon command during Maintenance mode so ZBUs $320_1$–$320_n$ are able to determine which end nodes are still under their supervision.

Referring still to FIG. 3, depending on the type of aircraft, SMU 310 may be coupled to pre-installed headend equipment 350, such as a well-known Cabin Intercommunication Data System ("CIDS"), through the first interface 355 preferably configured in accordance with the first selected protocol (e.g., ARINC 429 protocol). In an Airbus type system, the SMU 310 periodically signals the headend equipment 350 to perform various requested passenger services.

Alternatively, in a Boeing type system, one or more ZBUs, selected by its or their placement within the cabin of the aircraft, may be directly coupled to pre-installed headend equipment such as "area boxes" which are implemented in recently developed Boeing® 777 aircraft. Preferably, the coupling between the area box 360 and a ZBU (e.g., ZBU $320_1$), selected to communicate with area box 360, is a second interface 365 configured in accordance with a second selected protocol (e.g., ARINC 628 protocol). ZBU $320_1$ is responsible for signaling area box 360 if passenger service is requested within either the zone covered by ZBU $320_1$ or one or more adjacent zones covered by other ZBUs which are not directly connected to an area box.

It is contemplated, however, that other protocols besides ARINC 429 and ARINC 628 may be utilized, depending on the configuration of the pre-installed headend equipment.

Consequently, the PSS network 300 supports multiple types of vehicles aircraft by routing status of PSS information (referred to as "PSS status information") directly to pre-installed headend equipment through one of two information paths. The first information path includes routing a series of command messages containing PSS status information to SMU 310 through the digital communication bus 330, and subsequently, converting each command message into a message having a data structure in accordance with the first selected protocol through the first interface 355. The second information path includes routing command messages through a digital, serial communication bus 370 that couples a selected ZBU to a pre-installed area box. It is contemplated that other ZBUs, not directly coupled to an area box, may transfer messages to the selected ZBU for subsequent routing to that area box. The serial communication bus 370 supports a data transfer rate of approximately 100 Kbps and propagates command messages in compliance with the second selected protocol, such as ARINC 628 protocol as shown FIG. 6.

Figure 6:
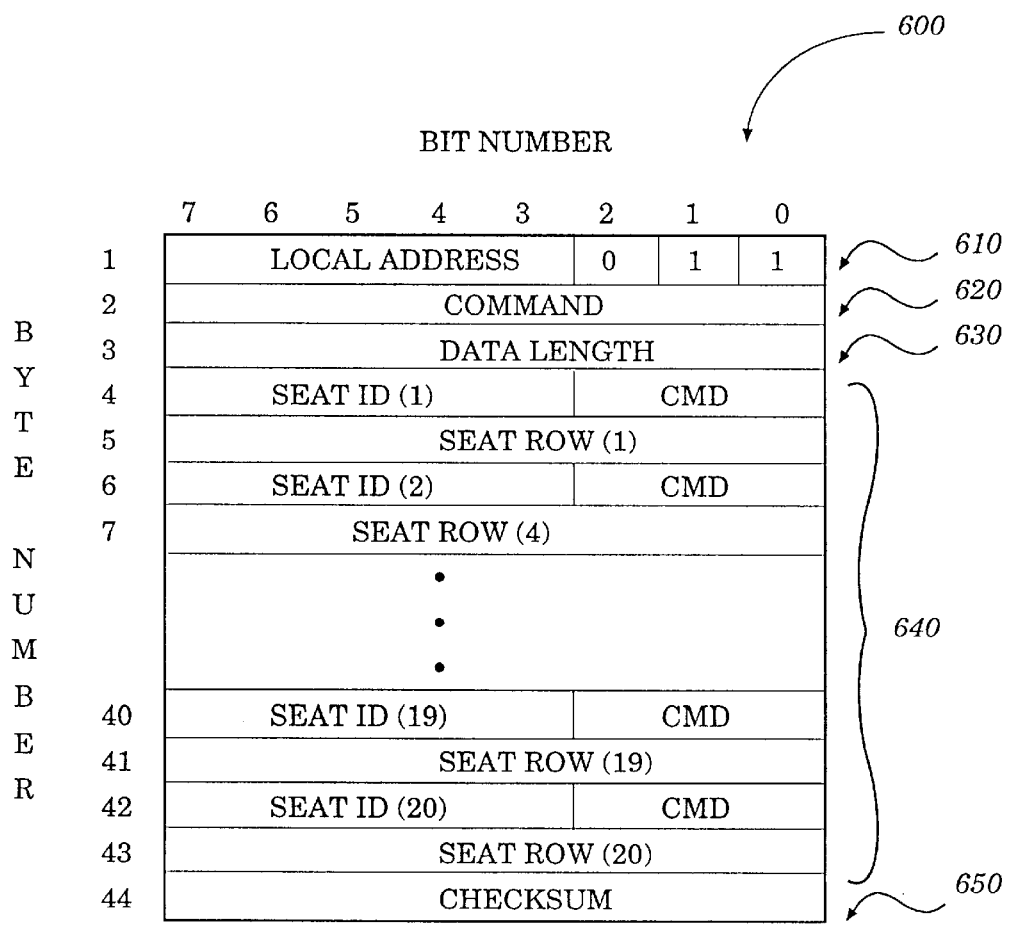
FIG. 6 is a bit representation of the data structure of a command message supported by an ARINC 628 protocol.

Referring now to FIG. 6, a block diagram of the data structure associated with ARINC 628 protocol is shown. The ARINC 628 protocol features a 44-byte command message 600 that is transmitted approximately every 20 milliseconds ("ms") from the selected ZBU. The first byte 610 of the command message 600 includes a 5-bit local address indicating the address of the ZBU attached to the area box. The second byte 620 of the command message 600 includes an 8-bit command which identifies the type of data contained in the message 20 H(ex). The third byte 630 of the command message is an 8-bit length field indicating the length of the command message 600. Bytes 4–43 640 are used for end node identification, namely seat and row, as well as a command logic state ("CMD") indicating the type of outstanding keystroke. The last byte 650 is a checksum which is used for error detection and correction.

As previously stated, the PSS network is designed to provide both zone configuration information of the aircraft and the PSS status associated with each end node in the vehicle to the SMU and all ZBUs. Thus, by designing the PSS network so that the SMU is aware of the PSS status of all end nodes in the vehicle, it may communicate that information to pre-installed headend equipment (e.g., a computer) on the vehicle in order to provide passenger services. Furthermore, by designing the PSS network so that all ZBUs are privy to zone configurations and PSS status of all end nodes in the vehicle, any ZBU may communicate with one or more computers (e.g. area boxes on Boeing® 777 aircraft) responsible for providing passenger services. This specific architecture provides flexible installation for use in many types of vehicles.

Figure 7:
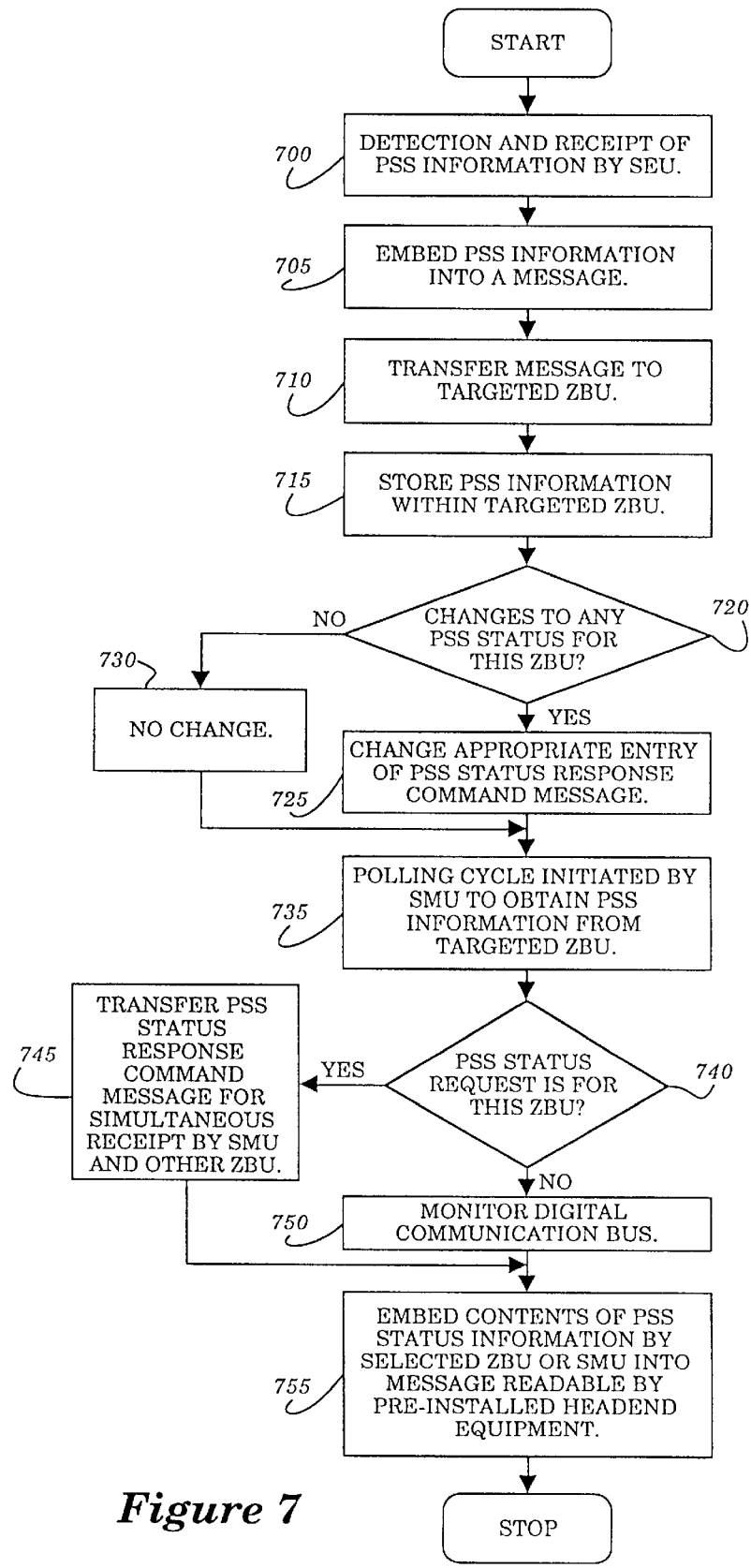
FIG. 7 is a flowchart illustrating the operational steps performed by the PSS network of FIG. 3 during PSS processing mode.

As shown in FIG. 7, a flowchart illustrating the operational steps undertaken by each ZBU during PSS servicing mode to process PSS status information independent of vehicle type is shown. For proper operation on Airbus and Boeing aircraft, it is recommended that PSS status information is processed within approximately 120 ms from depressing the control button to delivery of an appropriate message to the headend equipment. To process PSS information, the SEU detects and receives PSS information (i.e., a keystroke value) indicating that a passenger service has been requested by a passenger at an end node dedicated to the SEU (Step 700). Next, the SEU embeds the PSS information within a message placed in a format utilized by a digital bus (e.g., PAT bus) interconnecting the SEU and the targeted ZBU (Step 705). Upon being polled (approximately every 20 ms) by the targeted ZBU, the SEU transfers the message to that ZBU (Step 710). Thereafter, the targeted ZBU appropriately stores the PSS status information into a table contained in internal memory of the ZBU (Step 715). The contents of the table may also be modified when the ZBU also receives PSS status information being transmitted over the digital communication bus during data transmissions by other ZBUs.

After storing the PSS status information in internal memory, in Step 720, the targeted ZBU determines if there exist changes to the PSS status such as inactivation of the reading light from an active (ON) state, activation of the attendant call button from a normal inactive state, etc. If a change exists, an appropriate bit entry in a PSS Status Response command message (described below) is updated by clearing if set or setting if cleared (Step 725). Otherwise, the command message remains in its current state (Step 730).

In Step 735, the SMU initiates a polling cycle by sending a PSS Polling command message to the ZBU in order to obtain the PSS status information contained in the targeted ZBU and distribute the PSS status information to other ZBUs coupled to the digital communication bus. Each ZBU is polled in accordance with a round-robin priority scheme every 5 ms, and thus, polling of each ZBU takes place every "5×n" milliseconds, where "n" is the number of ZBUs are implemented in the PSS network. If the PSS Polling command message is corrupt when it arrives at the targeted ZBU, the targeted ZBU will respond. With no response, the SMU will time-out and go to the next polling cycle.

If the PSS polling command message is targeted to the ZBU, the ZBU responds by transferring the PSS Status Response command message through the digital communication bus to complete the polling cycle (Steps 740–745). Otherwise, if the ZBU is not targeted by the PSS polling command message, it listens to the digital communication bus for the targeted ZBU's response. This allows the ZBU to simultaneously receive the PSS status for its own use (Step 750). This architecture greatly reduces message traffic. Without a multi-drop communication protocol utilized by the digital communication bus, the SMU would have to poll each ZBU and re-distribute the PSS response data to each individual ZBU. Moreover, this protocol is also error tolerant. Thus, if any ZBU did not receive a PSS Status Response command message properly, that information may be transmitted again within (5×n) ms. There is no need for the listening ZBU to report an error in order to re-receive the information. Thereafter, the contents of the PSS Status Response command message are embedded by the selected ZBU, coupled to an area box or by SMU, into a message having a format recognized by headend equipment responsible for performing the operations necessary to provide the requested passenger service (Step 755). Such formatting may be performed by the selected ZBU(s) or the SMU.

Figure 8A:
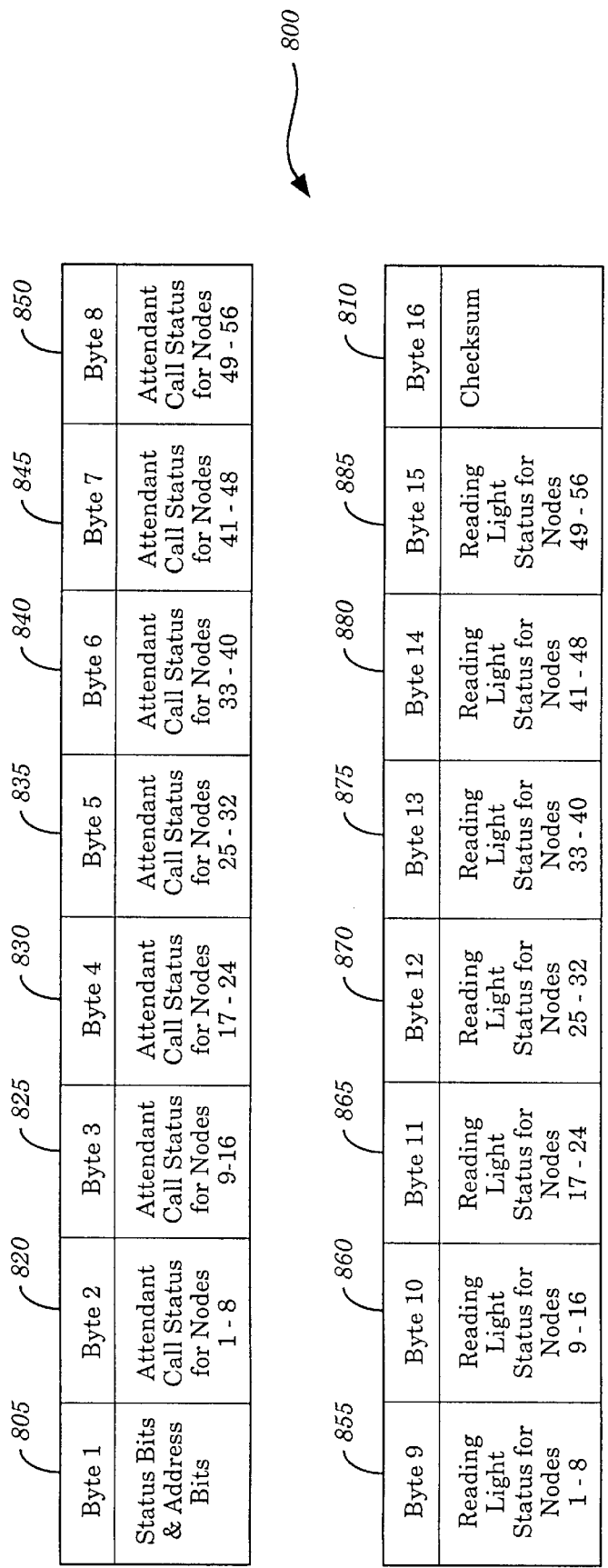
FIG. 8A is a bit representation of the data structure of a PSS Status Response command message.
Figure 8B:
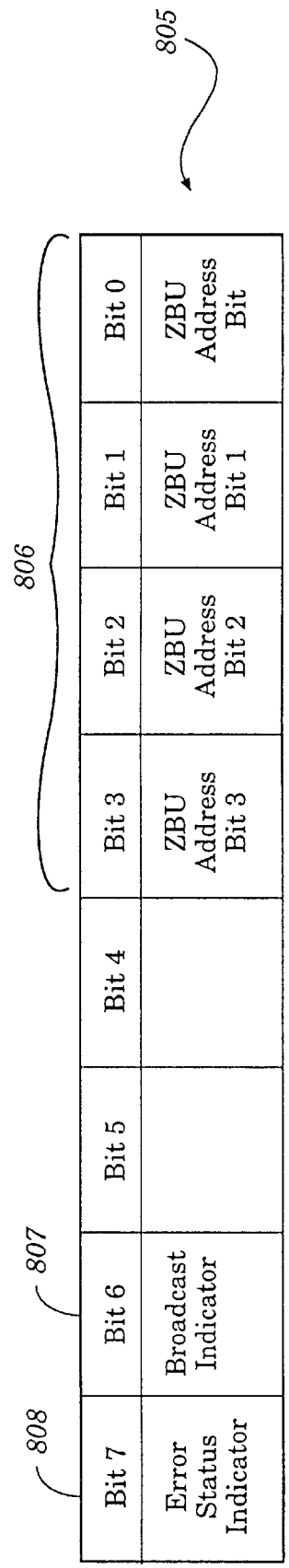
FIG. 8B is a bit representation of the data structure of the Status and Address overhead byte of the PSS Status Response command message of FIG. 8A.

Referring now to FIGS. 8A and 8B, the bit representation of the PSS Status Response command messages is shown. As shown in FIG. 8A, each PSS Status Response command message 800 is configured to be a fixed length (e.g., 16 bytes) containing two bytes 805 and 810 for overhead and fourteen bytes 820–885 for payload information. The fixed length is used in order to relieve the ZBU from determining the length of an incoming PSS Status Response command message upon receipt. Additionally, the selected sizing allows UARTs employed within the SMU (see FIG. 6) to interrupt the processor when the entire PSS a Status Response command message has been received. It is contemplated, however, that other fixed or variable message sizes may be used.

The overhead of the PSS Status Response command message 800 includes a Status and Address field 805 and a Checksum field 810. Preferably, in this embodiment, both of these fields are configured to be one byte in size although any bit width may be used. As shown in FIG. 8B, in the Status and Address field 805, the least significant nibble (i.e., bits 1–4) 806 are used to provide the address of the ZBU receiving or transmitting the PSS Status Response command message 800. The second most significant bit (bit 7) 807 is a broadcast indicator bit which is set to logic "1" when the PSS Status Response command message 800 is being simultaneously broadcasted to all of the ZBUs. In addition, the most significant bit (bit 8) 808 is an error status indicator bit which is set to logic "1" when the ZBU incurs an error. The checksum field 810 contains a value used to detect a transmission error through arithmetic techniques.

The payload (i.e., bytes 2–15) of the PSS Status Response command message 800 contains bit representations for each end node (e.g., seat) assigned to the ZBU. Since each ZBU is designed to accommodate approximately fifty end nodes, each bit corresponds to one end node with end nodes 51–56 reserved for expansion. These bit representations are used to indicate PSS status information for the Attendant Call and Overhead Reading Lamp illumination passenger services.

The present invention described herein may be designed in many different embodiments and using many different configurations. While the present invention has been described in terms of a preferred embodiment, other embodiments may come to mind to those skilled in the art without departing from the spirit and scope of the present invention. The invention should, therefore, be measured in terms of the claims which follow.

What is claimed is:

1. A digital passenger entertainment system that assists in providing passenger service operations to a plurality of end nodes on a vehicle, comprising:

a digital communication bus;

a plurality of zone bridge units coupled to the digital communication bus, each of the plurality of zone bridge units containing passenger service system (PSS) status information pertaining to a particular area of the vehicle; and a system manager unit coupled to the digital communication bus, the system manager unit polling each of the plurality of zone bridge units in accordance with a round-robin scheme in order to place a message, including updated PSS status information loaded into a targeted zone bridge unit, onto said digital communication bus to be read by at least one of the plurality of zone bridge units excluding the targeted zone bridge unit.

2. The digital passenger entertainment system according to claim 1, wherein said system manager unit is coupled to said digital communication bus to read the message including the updated PSS status information.

3. The digital passenger entertainment system according to claim 1, wherein each of said plurality of zone bridge units include a processor and internal memory sufficient in size to contain PSS status information associated with the plurality of end nodes.

4. The digital in-transit entertainment system according to claim 1, wherein said system manager unit includes a processor, at least one storage element and a PSS communication card coupled together through at least one bus, said PSS communication card is coupled to said digital communication bus.

5. The digital in-transit entertainment system according to claim 4, wherein said PSS communication card is coupled a first interface interconnecting the system manager unit to a headend equipment, the first interface is configured in accordance with an ARINC 429 protocol.

6. The digital in-transit entertainment system according to claim 4, wherein at least one zone bridge unit of said plurality of zone bridge units is coupled through a second interface interconnecting said at least one zone bridge unit with a headend equipment, the second interface being configured in accordance with an ARINC 628 protocol.

7. The digital in-transit entertainment system according to claim 1, wherein the system manager unit polls each of the plurality of zone bridge units in accordance with a round robin scheme.

8. A digital in-transit entertainment system that assists in providing passenger services to a plurality of end nodes on a vehicle, comprising:

a digital communication bus;

a plurality of zone bridge units coupled to the digital communication bus, each of the plurality of zone bridge units contains passenger service system (PSS) status information pertaining to a particular area of the vehicle and receives updated PSS status information of the particular area; and a system manager unit coupled to the digital communication bus, the system manager unit polls each of the plurality of zone bridge units in accordance with a round-robin scheme in order to place a message, including the updated PSS status information of a targeted zone bridge unit currently being polled, onto said digital communication bus in accordance with a predetermined protocol, said message to be read by the system manager unit and the plurality of zone bridge units excluding the targeted zone bridge unit.

9. The digital in-transit entertainment system according to claim 8, wherein said digital communication bus is a multi-drop bus operating in accordance with RS-485 standards.

10. The digital in-transit entertainment system according to claim 9, wherein each of said plurality of zone bridge units include a processor and internal memory sufficient size to contain PSS status information associated with the plurality of end nodes.

11. The digital in-transit entertainment system according to claim 8, wherein at least one zone bridge unit of said plurality of zone bridge units is coupled through a second interface interconnecting said at least one zone bridge unit with a headend equipment, the second interface being configured in accordance with an ARINC 628 protocol.

12. The digital in-transit entertainment system according to claim 8, wherein said message includes an overhead and a payload, said payload having a bit associated with each end node assigned to the targeted zone bridge unit.

13. The digital passenger entertainment system according to claim 12, wherein at least one zone bridge unit of said plurality of zone bridge units is coupled through a second interface interconnecting said at least one zone bridge unit with a headend equipment, the second interface being configured in accordance with an ARINC 628 protocol.

14. A digital passenger entertainment system that is used to provide information to a plurality of end nodes of a vehicle in order to perform at least one passenger service operation, comprising:

a digital communication bus;

a plurality of zone bridge units coupled to the digital communication bus, each of the plurality of zone bridge units (i) containing passenger service system (PSS) status information pertaining to a particular area of the vehicle, and (ii) receiving updated PSS status information of the particular area; and a system manager unit coupled to the digital communication bus, the system manager unit polling each of the plurality of zone bridge units in accordance with a round robin scheme to place at least the updated PSS status information onto said digital communication bus, said update PSS status information being further read by the zone bridge units not currently being polled by the system manager unit.

15. The digital in-transit entertainment system according to claim 14, wherein said first interface is configured in accordance with ARINC 429 protocol.

16. The digital passenger entertainment system according to claim 14, wherein each of said plurality of zone bridge units include a processor and internal memory sufficient in size to contain PSS status information associated with the plurality of end nodes.

17. A digital passenger entertainment system comprising:

a plurality of zone bridge units, each of the plurality of zone bridge units including a processor and an internal memory containing passenger service system (PSS) status information and being able to receive updated PSS status information; and a system manager unit coupled to the plurality of zone bridge units, the system manager unit including
a processor,
at least one storage element, and
a PSS communication card in communication with the processor and at least one of the plurality of zone bridge units, the PSS communication card including at least one interface configured in compliance with a selected protocol.

18. The digital passenger entertainment system of claim 17, wherein the selected protocol is one of an ARINC 429 protocol and an ARINC 628 protocol.

19. The digital passenger entertainment system of claim 17, wherein the PSS communication card includes a storage element;

a microcontroller; and at least two converters for coupling to both a headend equipment and the plurality of zone bridge units.

20. The digital passenger entertainment system of claim 19, wherein each of the at least two converters include a Universal Asynchronous Receiver Transmitter (UART).

* * * * *